March 17, 1959 J. M. CRAFTON 2,877,491
METHOD OF AND APPARATUS FOR PRODUCING BOARD PRODUCTS
Filed April 17, 1953 4 Sheets-Sheet 1
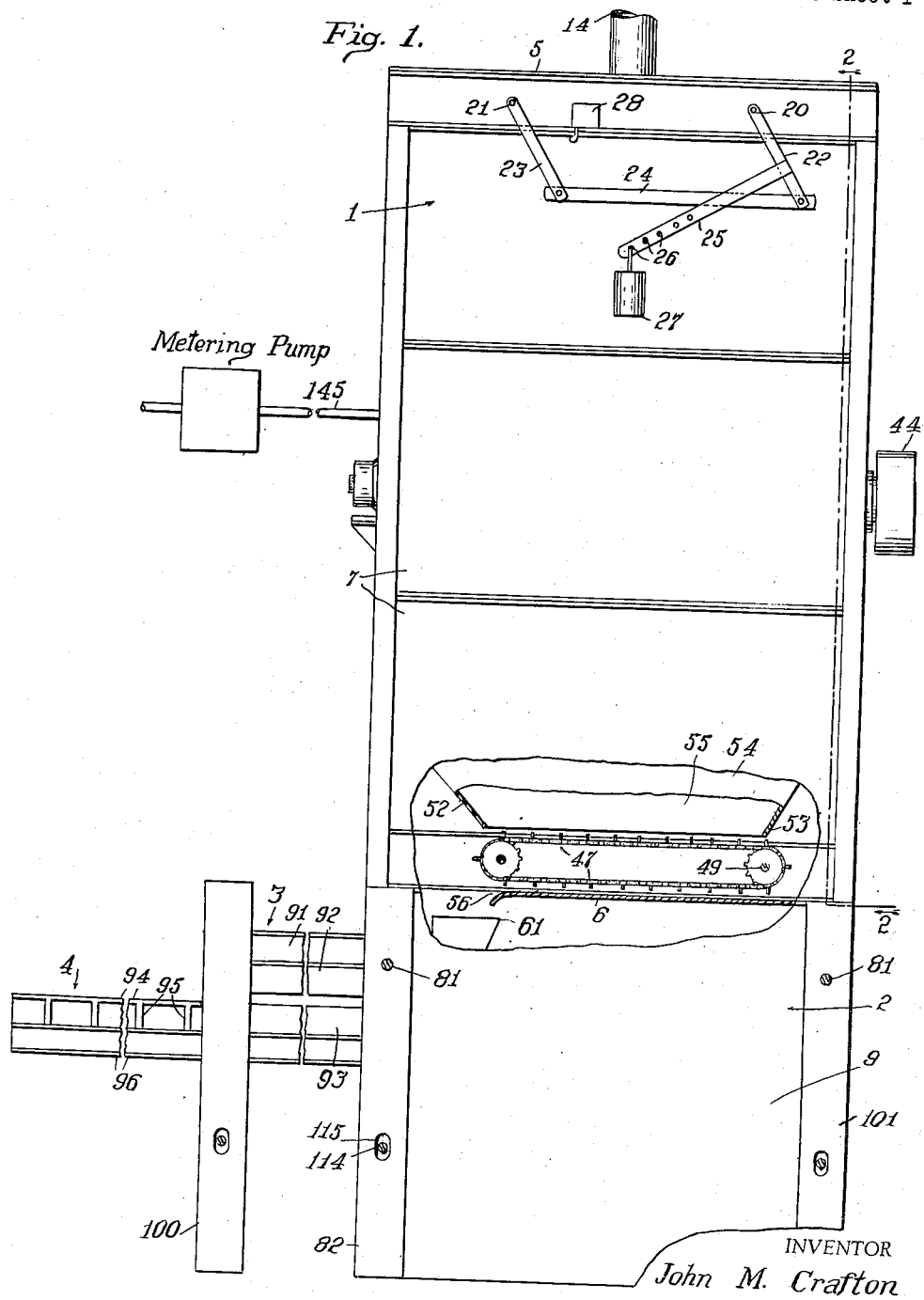
INVENTOR
John M. Crafton
BY
ATTORNEYS

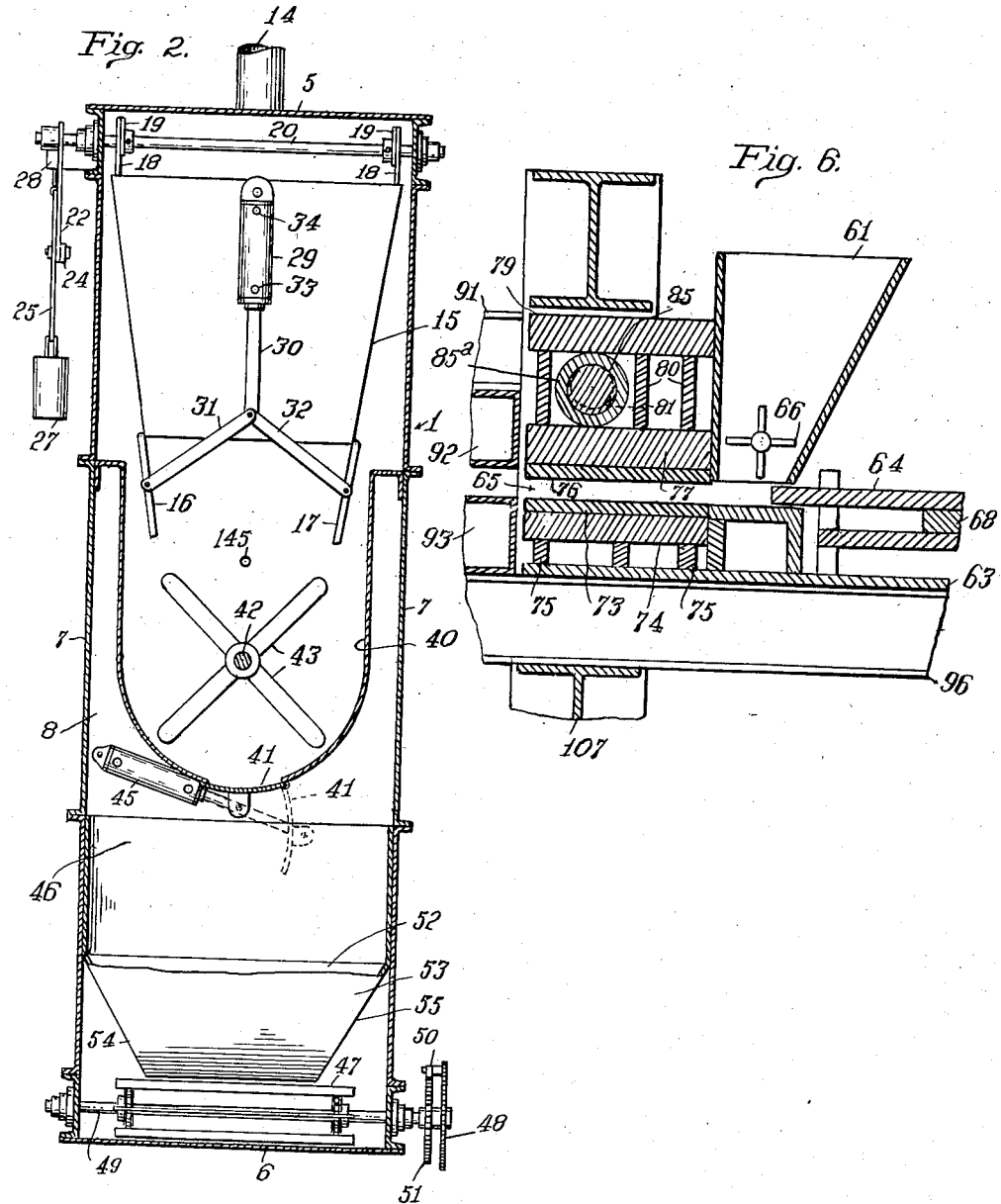

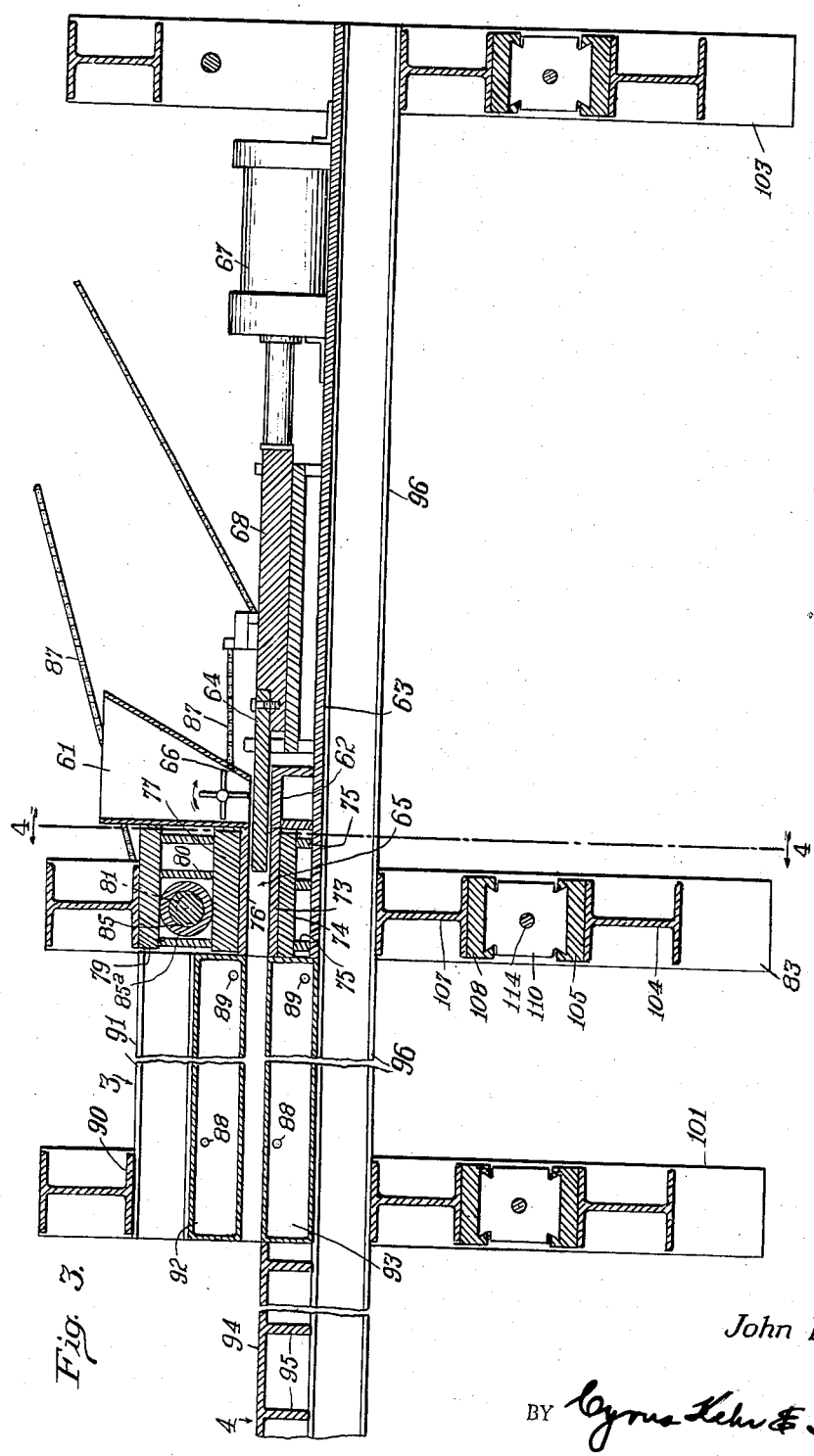

March 17, 1959 J. M. CRAFTON 2,877,491
METHOD OF AND APPARATUS FOR PRODUCING BOARD PRODUCTS
Filed April 17, 1953 4 Sheets-Sheet 4
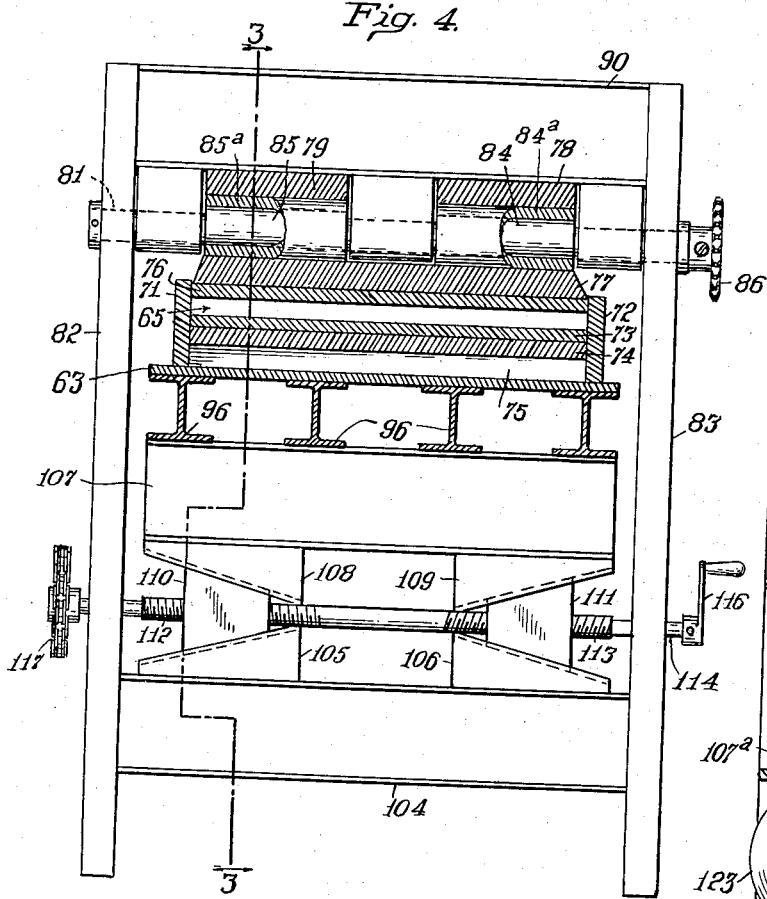
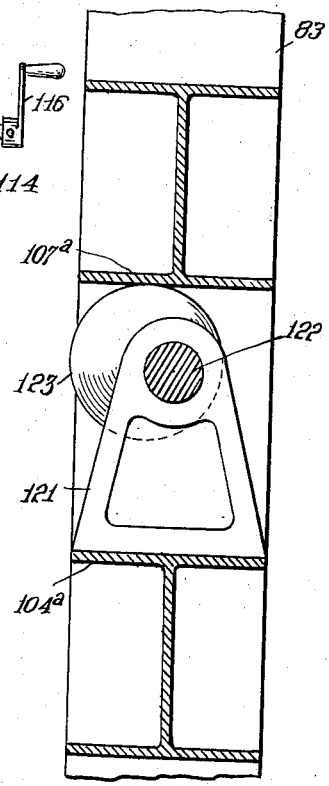
INVENTOR
John M. Crafton
BY
ATTORNEYS

United States Patent Office 2,877,491
Patented Mar. 17, 1959

2,877,491

METHOD OF AND APPARATUS FOR PRODUCING BOARD PRODUCTS

John M. Crafton, Morristown, Tenn.

Application April 17, 1953, Serial No. 349,520

5 Claims. (Cl. 18—5)

This invention relates to a method of and apparatus for producing board products, and it is the primary object of this invention to provide for the production of continuous sheets of material of substantially uniform density from fibrous materials and a resinous substance, from which sheets pieces of lengths appropriate for the intended uses of the board product may be cut.

Another object of this invention is to improve the extrusion of plastic compositions so as to increase the density and uniformity of the extruded products.

Another object of this invention is to increase the utility of extrusion machinery by providing means for changing the dimensions of the extrusion passage to change the dimensions of the product produced on the machine.

Still another object of this invention is the provision of means for delivering a suitably proportioned mixture of fibrous material and resin to the extrusion chamber so that the production of the board products may proceed as a continuous process in a single machine.

An embodiment of this invention capable of attaining the objects stated above includes means for feeding measured quantities of fibrous material and resin to a mixer where the ingredients are thoroughly mixed. The entire batch of the mixture produced in the mixer is delivered to a reservoir having an intermittently driven conveyor at its bottom which feeds portions of the batch in the reservoir into a small hopper. The hopper is located adjacent the entrance end of a board forming passage, and a reciprocating plunger moves through the hopper and into the passage to force portions of the mixture into the passage. As the plunger moves out of the passage, the top wall of the passage is moved downwardly to compress the mixture, and as the plunger moves into the passage, the top wall is moved upwardly to reduce friction and to allow admixture of the material from successively introduced portions of the mixture. The material in the passage is then heated to set the resin and harden the board. At the delivery end of the passage, the continuous sheet of board material is severed at suitable intervals. Means are also provided to adjust the elevation of the bottom wall of the board-forming passage to adjust the thickness of the board products.

Other objects and advantages of this invention will appear as the detailed description proceeds in connection with the accompanying drawings, in which:

Fig. 1 is an overall side view, with certain parts broken away and in section, of an embodiment of this invention;

Fig. 2 is a vertical sectional view, taken along line 2—2 in Fig. 1, of a portion of the machine shown in Fig. 1;

Fig. 3 is a vertical sectional view, taken along line 3—3 in Fig. 4, of another portion of the machine shown in Fig. 1;

Fig. 4 is a vertical sectional view taken along line 4—4 in Fig. 3;

Fig. 5 is a detail vertical sectional view of a portion of another embodiment of this invention; and Fig. 6 is a vertical sectional view similar to Fig. 3 but showing the parts in the positions they occupy at a different time.

The board forming machine of this invention comprises a metering, mixing and storage assembly 1, a board forming section 2, a resin curing section 3, and a board delivery section 4.

The metering, mixing and storage assembly is substantially enclosed by sheet metal top, bottom, side and end walls 5, 6, 7 and 8, respectively, so as to protect the atmosphere from contamination by the finely divided fibrous material. The other portions of the machine may or may not be covered as desired. As an example of a suitable covering, a sheet metal side wall 9 for the board forming section 2 is illustrated in Fig. 1. This wall has been omitted from the other views in the interest of simplicity of exposition.

The fibrous material, which may be wood chips, sawdust, peanut hulls, or the like, is fed by any suitable means from a bin (not shown) to the upper end of the metering, mixing and storage assembly 1. No specific feeding means has been shown because this particular structure forms no part of the invention to which this application is directed. As an example, the fibrous material may be transported from the bin by an air stream and deposited in the metering, mixing and storage assembly 1 through a conduit 14 communicating with an opening in the top wall 5.

The material entering the machine through conduit 14 falls into a weighing chamber 15 closed at its bottom by two pivotally mounted doors 16 and 17. The weighing chamber 15 is pivotally suspended from four links, two of which are designated by numerals 18 in Fig. 2. Each of the links 18 in turn is pivotally mounted on an arm 19 fixed on one of the transversely extending, rotatably mounted shafts 20 and 21. Downwardly extending arms 22 and 23 are fixedly mounted on the ends of shafts 20 and 21, respectively, and are connected at their lower ends by a pivotally mounted member 24 as shown in Fig. 1. An arm 25 is rigidly fixed to arm 22 in such a manner as to extend at approximately right angles therefrom. Several holes 26 are provided in arm 25 to receive a bail or other suitable means for connecting a weight 27 to the arm 25. An electric switch, diagrammatically indicated at 28 in Fig. 1, is mounted on the machine in the path of motion of arm 25.

When enough fibrous material has been fed to the weighing chamber 15 to overbalance the weight 27, the arm 25 rises and actuates the switch 28 to break an electrical circuit and thereby stop the feeding of fibrous material from the bin to the chamber 15. No specific circuit is shown because the details thereof are not important to an understanding of this invention. If, as suggested above, an air stream is used to feed the fibrous material, the switch 28 may conveniently be arranged to stop the motor which drives the blower.

An air cylinder 29 is mounted on an end wall of the weighing chamber 15 and connected through piston rod 30 and links 31 and 32 to open and close the doors 16 and 17. During the period when fibrous material is being fed into chamber 15, the lower hole 33 in the air cylinder is connected through suitable tubing to a source of compressed air and the upper hole 34 is connected to the atmosphere. When the fibrous material is to be dumped out of the chamber 15, the above relationship is reversed. The upper hole 34 is connected to a source of compressed air, and the lower hole 33 is connected to the atmosphere. Suitable valve means, operable either manually or automatically in response to the actuation of the switch 28, is employed to control the connections between the air cylinder 29 and the source of compressed air.

The fibrous material dumped from weighing chamber 15 falls into a mixing chamber 40 having a pivotally mounted door 41 extending across the bottom thereof. Fixedly mounted on a shaft 42 extending from one end of the mixing chamber to the other are radially extending mixing or stirring elements or blades 43. The lower portion of the chamber 40 and the door 41 are smoothly curved about the axis of the shaft 42, as shown, so that there will be no portions of the mixing chamber into which the material may move to escape the action of the mixing blades 43. The shaft 42 is rotated during the entire period in which a batch of fibrous material is located in mixing chamber 40 by suitable means connected to the pulley 44.

The resinous substance, which may be urea formaldehyde, a phenolic resin, or any other suitable resin, is sprayed on the batch of fibrous material in the mixing chamber while the mixing blades 43 are in operation. The resin is pumped by a metering pump, diagrammatically indicated in Fig. 1, which will supply the proper amount of resin for the amount of chips supplied from the weighing chamber 15. A conduit 145 is provided for transmitting the resin from the metering pump to the mixing chamber 40.

Operation of the metering pump may be controlled manually or automatically in response to the actuation of the switch 28. Automatic operation will generally be found to be preferable in that it will insure proper coordination of the various operations. The details of the metering pump and the means for controlling it are not shown because these features, per se, form no part of this invention.

As an operative example, it may be stated that good results are obtained when 80 pounds of wood chips are mixed with 16 pounds of urea formaldehyde for about four or five minutes. However, the proportions and the time stated are merely exemplary and are not to be considered critical. Various suitable compositions for fiber board materials of the type with which this invention is concerned are well known to those skilled in the art, and the time required to obtain sufficient mixing of the ingredients will depend upon the ingredients used and the details of the apparatus employed to mix them.

After the material in the mixing chamber 40 has been properly mixed, an air cylinder 45 pivotally mounted on the end wall 8, as shown, is actuated by suitable manual or automatic control means, not shown, to swing the door 41 to its open position, indicated in dotted lines in Fig. 2, and allow the mixture of fibrous material and resin to drop down into the storage compartment 46.

An endless conveyor 47 located in the bottom of the compartment 46 is intermittently driven by means connected to the reciprocating crosshead 68 to be referred to more specifically below. Such means may comprise a sprocket wheel 48 rotatably mounted on a shaft 49 and oscillated by a chain 87 connected to the crosshead 68, a pawl 50 carried by the sprocket wheel 48, and a ratchet wheel 51 fixed on the shaft 49 in position to be engaged by the pawl 50. An adjustable, partial cover for the ratchet wheel 51 (omitted from the drawings in the interest of clarity) is preferably provided so that the extent of the motion imparted to the endless conveyor 47 upon each stroke of the crosshead 68 may be varied as desired.

The sloping walls 52, 53, 54 and 55 of the storage compartment 46 direct the material onto the surface of the endless conveyor 47 which feeds increments thereof beneath the lower edge of wall 52 and dumps them through the opening 56 in the bottom wall 6 down into a hopper 61 in the board forming section 2.

A hopper bottom 62 is supported on a bed plate 63 in the position shown, and a plunger 64 reciprocates across the bottom of the hopper 61 to feed the mixture of fibrous material and resin from the hopper 61 into the board-forming passageway 65. An agitator 66 in the hopper 61 is continuously rotated by a separate motor, not shown, to keep the material in a fluid condition and assure delivery thereof into the opening directly beneath the hopper 61 when the plunger 64 is at the rearmost portion of its stroke.

The plunger 64 is preferably made of or coated with bronze to keep the mixture of fibrous material and resin from adhering thereto. Reciprocating motion is imparted to the plunger 64 by a hydraulic cylinder 67 acting through a crosshead diagrammatically indicated at 68 in Fig. 3. Both the cylinder 67 and the crosshead 68 are supported by the bed plate 63.

The side plates 71 and 72 mounted on the bed plate 63 close the sides of the board forming passageway 65. The bottom wall of the passageway 65 is formed by a bronze plate 73 backed by a member 74 supported on the bed plate 63 through suitable spacer blocks, two of which are designated by the numerals 75 in Fig. 3. The top wall of the passageway 65 is formed by a bronze plate 76 backed by a member 77 which is connected to the blocks 78 and 79 by a plurality of spacers such as those designated by the numeral 80. A shaft 81 is rotatably mounted in the upright posts 82 and 83 of the machine framework and has eccentric portions 84 and 85 disposed between the backing member 77 and the blocks 78 and 79 and between adjacent spacers 80. The assembly of parts 76, 77, 78, 79 and 80 is constrained to move in a vertical path by guides, not shown, and collars 84a and 85a are provided on the eccentric portions 84 and 85, respectively, to reduce friction.

A sprocket wheel 86 is fixed on the shaft 81 adjacent an end thereof and is engaged by a chain 87 (Fig. 3) which is connected at its ends to the crosshead 68. By reason of these connections, vertical motion is imparted to the top plate 76 so as to vary the dimensions of the board-forming passageway 65 in timed relation to the motion of the plunger 64.

As the plunger 64 moves forwardly to insert an increment of the mixture of fibrous material and resin from the hopper 61 into the passageway 65, the eccentric portions 84 and 85 lift the top plate 76 to relieve undue friction and pressure during this period. The extent of upward motion may be regulated by replacing the sprocket wheel 86 with another of different diameter so as to change the amount of angular motion imparted to the shaft 81. As the plunger 64 moves rearwardly, the eccentric portions 84 and 85 lower the top plate 76 to compress the material in the passageway 65. Fig. 3 shows the parts in the positions assumed when the plunger 64 is in its forwardmost position, and Fig. 6 shows the parts in the positions assumed when the plunger 64 is in its rearmost position. Under these conditions the extrusion operation can proceed with a minimum of localized disturbances or inequalities and greater uniformity in the density of the board is achieved. Since an increment of the plastic mixture is compressed to the smallest height of the passageway 65 prior to the introduction of the succeeding increment during which introduction the passageway expands to its greatest height, a portion of the succeeding increment will flow over the rear edge of the preceding increment. Subsequent compression on the next downward movement of the top plate 76 causes a fusion of the material of the two increments so that there is substantially no difference in the density of the board product along its entire length.

The mixture of fibrous material and resin compressed and shaped in the board forming section 2 passes on to the portion of the passageway in the resin curing section 3 where it is heated for a sufficient time and temperature to set the resin. The use of suitable conditions for particular compositions is well within the skill of the art. As an example of suitable conditions, the mixture defined above may be heated at 320° Fahrenheit for 15 minutes. The heating means illustrated is a steam heating apparatus comprising upper and lower steam boxes 92 and 93 forming the top and bottom walls of the passageway. The upper steam box 92 is fixed to the longitudinally extending I-beams 91 carried by the transverse beams 90 of the frame, and the lower steam box 93 is supported by the longitudinally extending I-beams 96. The inlet and outlet holes 88 and 89 are connected with suitable means (not shown) for circulating the heating medium. It will be apparent, however, that other heating means may be used as desired. For example, the board material may be heated by being passed through a suitable high frequency electric field. Still other means will no doubt suggest themselves to those concerned with machinery of this type.

The fiber board product in its final form passes from the resin curing section 3 out onto a table 94 in the board delivery section 4 where lengths corresponding to the intended uses of the board are cut from the advancing sheet. No specific cutting means is shown because this structure per se forms no part of this invention. Conventional power driven, rotary wood saws may be used if desired, the same being mounted and operated, for example, so as to move across the width of the board during the period when the plunger 64 is moving rearwardly.

The table 94 is supported through spacing elements 95 on the same I-beams 96 which support the bottom steam box 93 and the bed plate 63. The top surfaces of the table 94, the lower steam box 93, the bottom plate 73 of the former section and the hopper bottom 62 are preferably in the same horizontal plane as shown in Fig. 3. When it is desired to change the thickness of the board being produced by the machine, this plane is moved up or down as desired by adjustment of the elevation of the I-beams 96.

Each of the upright posts 82 and 83 is one of a longitudinal series of posts extending along the sides of the machine. Others of the two series are designated by the numerals 100, 101 and 102, 103, respectively, the actual number of posts in the machine depending upon the lengths of the resin-curing and board-delivery sections used. Each transversely aligned pair of upright posts bears means for adjustably supporting the I-beams 96. Such means will be described specifically in connection with the pair of posts designated 82 and 83, similar means being provided for the other posts.

The posts 82 and 83 are secured as by welding to the ends of a connecting beam 104 having two oppositely directed wedge means 105, 106 on its upper surface. The I-beams 96 are supported by another transversely extending beam 107 positioned above the beam 104 and having two oppositely directed wedge means 108, 109 on its lower surface. A block 110 having a sloping upper surface and a sloping lower surface is positioned between the wedge means 105 and 108, and a similar block 111 is positioned between the wedge means 106 and 109. The blocks 110 and 111 have projections on their upper and lower surfaces which lock into tracks or notches cut in the mating surfaces of the wedge means 105, 106, 108 and 109, as shown in Fig. 3 and indicated in dotted lines in Fig. 4.

The blocks 110 and 111 threadedly engage the oppositely directed threaded portions 112 and 113, respectively, of a rod 114 which passes through slots 115 (Fig. 1) in the upright posts 82 and 83. By rotating the rod 114, the blocks 110 and 111 may be moved closer together or farther apart to adjust the elevation of the I-beams 96. The rod 114 at each station may be rotated independently as by a crank 116 fixed on an end thereof. More conveniently, however, the adjustments at all the stations may be coordinated by providing each rod 114 with a sprocket wheel 117 and connecting all of the sprocket wheels together by suitable chain means.

Figure 5 shows an alternative means for adjusting the elevation of the I-beams 96 which is somewhat less expensive to manufacture than the wedge system described above. In this embodiment a connecting beam 104a corresponding to the beam 104 has fixed thereto a series of brackets such as 121. A rod 122 is journaled in these brackets and carries a plurality of eccentrics such as 123 which bear directly against the lower face of a beam 107a corresponding to the beam 107, to control the elevation thereof. Suitable means for angularly positioning the rod 122 are of course provided.

In the above description the board product has been assumed to be flat. However, this is just one example of the configurations which may be made according to the present invention. Curved pieces or flat pieces with holes might also be made if desired.

Other variations and modifications will suggest themselves to those skilled in the art. Consequently, the specific description given above must be considered as illustrative only, and the scope of the invention determined from the claims which follow.

I claim:

1. Apparatus for producing products from a plastic mixture of fibrous material and binder comprising top, bottom and side wall members forming a passageway of a shape corresponding to the shape of the product, a plunger having a similar shape and being movable horizontally into and out of said passageway to force increments of the plastic mixture into and along said passageway, drive means for moving said plunger, a frame, means on said frame supporting said bottom wall member, a shaft rotatably mounted in said frame and having an eccentric portion thereon, means mounting said top wall member on said eccentric portion, and means connecting the plunger drive means to said shaft for moving the eccentric portion to lower said top wall member as said plunger is withdrawn from said passageway to compress the plastic mixture in said passageway and to raise said top wall member as said plunger is introduced into said passageway to increase the depth of said passageway sufficiently to allow the plastic mixture being forced into the passageway by said plunger to flow over the trailing edge of the preceding increment of plastic mixture in overlapping relation therewith.

2. A method of producing products from a plastic mixture of fibrous material and a binder comprising forcing a first increment of said composition into a passage, reducing the cross sectional area of said passage after said first increment has completed its initial advance into said passage to compress the increment and shape it to conform to the reduced cross sectional area of said passage, increasing the cross sectional area of said passage, forcing a second increment of said composition into said passage so that said first increment will be advanced by said second increment and a portion of said second increment will flow over the trailing edge of said first increment in overlapping relation therewith, reducing the cross sectional area of said passage after said second increment has completed its initial advance into said passage to compress said second increment and cause a mixing and uniting of the first and second increments, and then treating the united first and second increments to harden the plastic composition.

3. A method of making wide, thin board products comprising intermittently forcing successive increments of a mixture of fibrous material and a resin into an end of a horizontal passageway the entrance portion of which is variable in depth, decreasing the depth of said entrance portion by moving one of the walls corresponding in width to the width of the board product toward the other such wall after each increment has been forced into the passageway to compress the mixture in a direction transverse to the direction of feed, then increasing the depth of said entrance portion to reduce the frictional resistance to the forcing of the mixture into said passageway and to allow each increment to flow over the trailing edge of the preceding increment in overlapping relation therewith and treating the mixture forming the successive, intermixed increments in said passageway to set the resin and produce a dense board product of substantially uniform density throughout.

4. Apparatus for producing products from a plastic mixture of fibrous material and a binder comprising an elongated product forming chamber including an entrance end portion in which the plastic mixture is shaped and compressed and a subsequent portion in which said binder is set to solidify the mixture in the desired shape, a plunger reciprocating in a direction parallel to the longitudinal axis of said chamber for forcing increments of said plastic mixture into the entrance end portion of said chamber, said entrance end portion of said chamber including a pair of opposed walls extending parallel to the axis of said chamber and being mounted for relative movement toward and away from each other in a direction perpendicular to the axis of said chamber, the length of said entrance end portion being substantially greater than the length of one of said increments, and means operable in timed relation to the motion of said plunger to move said opposed walls relatively toward each other after each increment of the plastic mixture is forced into said entrance end portion to compress the material and to move said opposed walls relatively away from each other before said plunger has completed each of its mixture forcing strokes to increase the cross sectional area of said entrance portion sufficiently to allow the plastic mixture being forced into said entrance end portion to flow over the trailing edge of the preceding increment in overlapping relation therewith.

5. Apparatus for producing board products from a mixture of fibrous material and a resin comprising top, bottom and side wall members forming a passage, a plunger for forcing portions of said mixture into and through said passage, a frame, means on said frame supporting said top wall member, first wedge means fixed with respect to said bottom wall member and having a pair of oppositely directed, downwardly sloping lower surface portions each of which is provided with a notch therein, second wedge means below said first wedge means fixed with respect to said frame and having a pair of oppositely directed, upwardly sloping upper surface portions each of which is provided with a notch therein and each of which is disposed in vertical alignment with one of said surface portions of said first wedge means, a pair of blocks each having two sloping surfaces with projections thereon respectively locking with said notches in the aligned surface portions of said first and second wedge means, and a screw threadedly engaging both of said blocks for moving said blocks toward or away from each other along the sloping surfaces of said wedge means to vary the elevation of said bottom wall member, whereby the depth of said passage may be changed to permit the formation of board products of different thicknesses.

References Cited in the file of this patent

UNITED STATES PATENTS

| | | |
|---|---|---|
| 1,775,735 | Reker | Sept. 16, 1930 |
| 2,159,559 | Lawyer | May 23, 1939 |
| 2,168,889 | Thomas | Aug. 8, 1939 |
| 2,195,683 | Ross et al. | Apr. 30, 1940 |
| 2,296,516 | Goss | Sept. 22, 1942 |
| 2,317,331 | Mearig | Apr. 20, 1943 |
| 2,318,203 | Crosby | May 4, 1943 |
| 2,335,308 | Pendergast et al. | Nov. 30, 1943 |
| 2,342,769 | Suchann | Feb. 29, 1944 |
| 2,365,482 | Manken et al. | Dec. 19, 1944 |
| 2,485,523 | Ashbaugh | Oct. 18, 1949 |
| 2,587,930 | Uschmann | Mar. 4, 1952 |
| 2,618,813 | Patton et al. | Nov. 25, 1952 |
| 2,708,770 | Herres et al. | May 24, 1955 |

FOREIGN PATENTS

| | | |
|---|---|---|
| 153,812 | Germany | Aug. 2, 1904 |
| 260,855 | Great Britain | Nov. 11, 1926 |